United States Patent
Rheaume (10) Patent No.: US 11,260,346 B2
(45) Date of Patent: Mar. 1, 2022

(54) INERTING SYSTEM

(71) Applicant: Hamilton Sundstrand Corporation, Charlotte, NC (US)

(72) Inventor: Jonathan Rheaume, West Hartford, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 736 days.

(21) Appl. No.: 16/018,017

(22) Filed: Jun. 25, 2018

(65) Prior Publication Data

US 2019/0388832 A1  Dec. 26, 2019

(51) Int. Cl.
| | |
|---|---|
| *B01D 53/32* | (2006.01) |
| *B01D 53/22* | (2006.01) |
| *B01D 53/26* | (2006.01) |
| *B64D 37/32* | (2006.01) |
| *B64D 45/00* | (2006.01) |

(52) U.S. Cl.
CPC ......... *B01D 53/326* (2013.01); *B01D 53/229* (2013.01); *B01D 53/265* (2013.01); *B01D 53/268* (2013.01); *B64D 37/32* (2013.01); *B64D 45/00* (2013.01); *B64D 2045/009* (2013.01)

(58) Field of Classification Search
CPC .. B01D 53/326; B01D 53/229; B01D 53/268; B01D 2256/10; B01D 2259/4575; B64D 37/32; A62C 99/0018; A62C 3/08
See application file for complete search history.

(56) References Cited

U.S. PATENT DOCUMENTS

| | | | |
|---|---|---|---|
| 8,567,516 B2 | 10/2013 | Bleil et al. |
| 8,568,934 B2 | 10/2013 | Naeve et al. |
| 9,623,981 B2 | 4/2017 | Darling et al. |
| 9,731,630 B2 | 8/2017 | Sasaki et al. |
| 2015/0040986 A1 | 2/2015 | Tichborne et al. |
| 2015/0321583 A1 | 11/2015 | Sasaki et al. |

(Continued)

FOREIGN PATENT DOCUMENTS

| | | |
|---|---|---|
| EP | 3284676 A1 | 2/2018 |
| WO | 2007054316 A1 | 5/2007 |

OTHER PUBLICATIONS

Jonathan Rheaume, "Selective Method of Operation of Ullage Passivation System",U.S. Appl. No. 15/378,687, filed Dec. 14, 2016.

(Continued)

*Primary Examiner* — Nicholas McFall
(74) *Attorney, Agent, or Firm* — Cantor Colburn LLP (57) ABSTRACT

A system is disclosed for providing inerting gas to a protected space. The system includes an electrochemical cell including a cathode, an anode separated by a separator that includes an ion transfer medium, and an electrical connection to a power source or power sink. A cathode fluid flow path is in operative fluid communication with a catalyst at the cathode between a cathode fluid flow path inlet and a cathode fluid flow path outlet, and an anode fluid flow path is in operative fluid communication with a catalyst at the anode, and includes an anode fluid flow path outlet. A cathode supply fluid flow path is disposed between the protected space and the cathode fluid flow path inlet, and an inerting gas flow path is in operative fluid communication with the cathode flow path outlet and the protected space.

15 Claims, 5 Drawing Sheets

(56) References Cited

U.S. PATENT DOCUMENTS

| | | | |
|---|---|---|---|
| 2015/0333347 A1 | 11/2015 | Brunaux et al. | |
| 2016/0118679 A1 | 4/2016 | Joos et al. | |
| 2017/0018792 A1 | 1/2017 | Buelte et al. | |
| 2017/0167036 A1 | 6/2017 | Tew et al. | |
| 2017/0167037 A1* | 6/2017 | Rheaume | C25B 9/18 |
| 2017/0331131 A1* | 11/2017 | Rheaume | A62C 3/08 |
| 2017/0341019 A1 | 11/2017 | Rheaume et al. | |
| 2017/0368496 A1 | 12/2017 | Rheaume et al. | |
| 2018/0001124 A1 | 1/2018 | Klassen et al. | |
| 2018/0050300 A1* | 2/2018 | Rheaume | A62C 99/0018 |
| 2018/0127110 A1* | 5/2018 | Cordatos | A62C 3/08 |
| 2018/0140996 A1 | 5/2018 | Rheaume | |
| 2018/0272283 A1 | 9/2018 | Rheaume et al. | |

OTHER PUBLICATIONS

European Search Report Issued in European Application No. 19182358.2 dated Jan. 8, 2020; 8 Pages.

\* cited by examiner

INERTING SYSTEM

BACKGROUND

The subject matter disclosed herein generally relates to systems for providing inerting gas, and more particularly to inerting systems for aircraft fuel tanks.

It is recognized that fuel vapors within fuel tanks become combustible or explosive in the presence of oxygen. An inerting system decreases the probability of combustion or explosion of flammable materials in a fuel tank by maintaining a chemically non-reactive or inerting gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inerting gas such as nitrogen-enriched air (NEA) (i.e., oxygen-depleted air or ODA) to the ullage, thereby displacing oxygen with a mixture of nitrogen and oxygen at target thresholds for avoiding explosion or combustion.

It is known in the art to equip aircraft with onboard inerting gas generating systems, which supply nitrogen-enriched air to the vapor space (i.e., ullage) within the fuel tank. The nitrogen-enriched air has a substantially reduced oxygen content that reduces or eliminates oxidizing conditions within the fuel tank. Onboard inerting gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for NEA at precisely the time when engines could be throttled back for fuel savings so that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture, which utilizes electrical systems to replace most of the pneumatic systems to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

BRIEF DESCRIPTION

A system is disclosed for providing inerting gas to a protected space. The system includes an electrochemical cell including a cathode, an anode separated by a separator that includes an ion transfer medium, and an electrical connection to a power source or power sink. A cathode fluid flow path is in operative fluid communication with a catalyst at the cathode between a cathode fluid flow path inlet and a cathode fluid flow path outlet, and an anode fluid flow path is in operative fluid communication with a catalyst at the anode, and includes an anode fluid flow path outlet. A cathode supply fluid flow path is disposed between the protected space and the cathode fluid flow path inlet, and an inerting gas flow path is in operative fluid communication with the cathode flow path outlet and the protected space.

In some embodiments, the system further includes a gas treatment module configured to remove fuel vapor, smoke, or a contaminant from the cathode supply flow path.

In some embodiments, the gas treatment module includes any one or combination of: a filter, an adsorbent, a membrane separator, a catalytic combustor, electrostatic precipitator, a scrubber, a condensing separator, and a gas-liquid separator.

In some embodiments, the gas treatment module includes a membrane separator comprising the cathode supply fluid flow path on a first side of a membrane, and the inerting gas flow path as a sweep gas on a second side of the membrane.

In any one or combination of the foregoing embodiments, the system can further include a water removal module on the cathode supply fluid flow path, or the cathode fluid flow path, or the inerting gas flow path.

In any one or combination of the foregoing embodiments, the water removal module is on the inerting gas flow path.

In any one or combination of the foregoing embodiments, the water removal module includes any one or combination of: a heat exchanger condenser, a gas-liquid separator, a membrane dryer, a desiccant.

In any one or combination of the foregoing embodiments, the water removal module comprises a heat exchanger condenser and a membrane dryer.

In some embodiments, the membrane dryer includes the inerting gas flow path on a first side of a membrane, and a sweep gas flow path comprising ram air exhaust from a heat absorption side of the heat exchanger condenser.

In any one or combination of the foregoing embodiments, the ion transfer medium comprises a proton exchange membrane, and the electrochemical cell is configured to produce protons at the anode and transfer the protons across the proton exchange membrane to the cathode.

In any one or combination of the foregoing embodiments, the ion transfer medium comprises a solid oxide, and the electrochemical cell is configured to produce oxygen anions at the cathode and transfer the oxygen anions across the solid oxide ion transfer medium to the anode.

In any one or combination of the foregoing embodiments, the inerting gas flow path is further in operative communication with a fire suppression system.

In any one or combination of the foregoing embodiments, the protected space comprises a fuel tank ullage space.

According to some embodiments, an aircraft comprises an aircraft body and an engine, and the system of any one or combination of the foregoing embodiments.

According to any one or combination of the foregoing embodiments, the aircraft protected space is selected from a fuel tank ullage space, a cargo hold, or an equipment bay.

According to any one or combination of the foregoing embodiments, the aircraft cathode supply fluid flow path receives fluid flow from any one or more of the fuel tank ullage space, cargo hold, or equipment bay, and the inerting gas flow path delivers inerting gas to any one or more of the fuel tank ullage space, cargo hold, or equipment bay.

According to any one or combination of the foregoing embodiments, the aircraft protected space comprises a fuel tank ullage space.

According to some embodiments, a method is disclosed of inerting a protected space. According to the method gas is delivered from the protected space to a cathode of an electrochemical cell. Oxygen is reduced at the cathode to generate oxygen-depleted air at the cathode of the electrochemical cell, and the oxygen-depleted air is directed from the cathode of the electrochemical cell along an inerting gas flow path to the protected space.

BRIEF DESCRIPTION OF THE DRAWINGS

The following descriptions should not be considered limiting in any way. With reference to the accompanying drawings in which like elements are numbered alike.

DETAILED DESCRIPTION

Figure 1A:
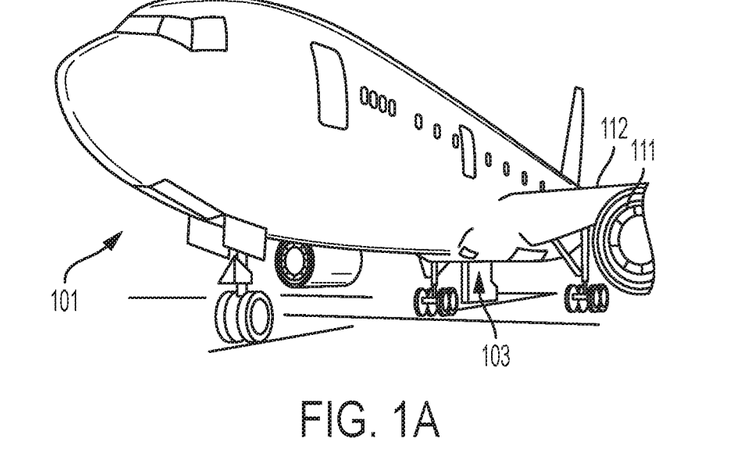
FIG. 1A is a schematic illustration of an aircraft that can incorporate various embodiments of the present disclosure.
Figure 1B:
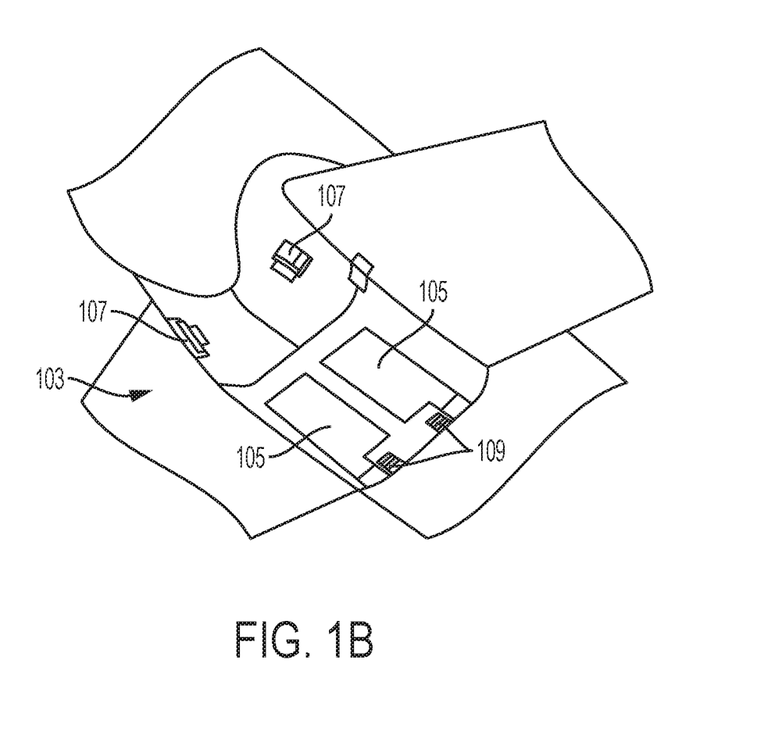
FIG. 1B is a schematic illustration of a bay section of the aircraft of FIG. 1A.

A detailed description of one or more embodiments of the disclosed apparatus and method are presented herein by way of exemplification and not limitation with reference to the Figures As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to environmental control systems and/or fuel inerting systems, as will be appreciated by those of skill in the art.

Figure 2:
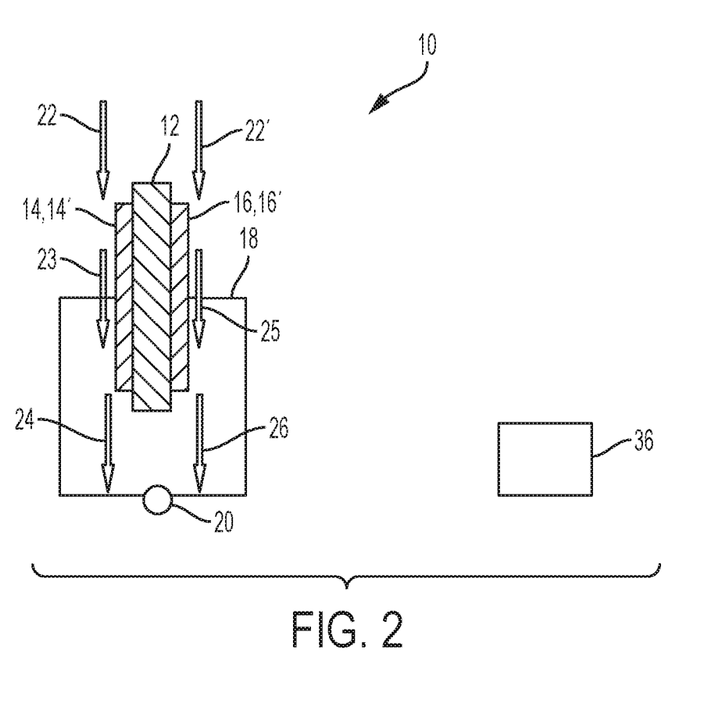
FIG. 2 is a schematic depiction an example embodiment of an electrochemical cell.

Referring now to FIG. 2, an electrochemical cell is schematically depicted. The electrochemical cell 10 comprises a separator 12 that includes an ion transfer medium. As shown in FIG. 2, the separator 12 has a cathode 14 disposed on one side and an anode 16 disposed on the other side. Cathode 14 and anode 16 can be fabricated from catalytic materials suitable for performing the needed electrochemical reaction (e.g., the oxygen-reduction reaction at the cathode and an oxidation reaction at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Some organic materials and metal oxides can also be used as catalysts, as contrasted to electrochemical cells utilizing proton exchange membranes where the conditions preclude the use of metal oxide catalysts. Examples of metal oxide catalysts include, but are not limited to ruthenium oxides, iridium oxides or transition-metal oxides, generically depicted as $M_xO_y$, where x and y are positive numbers [capable of forming a stable catalytic metal oxide such as $Co_3O_4$. Cathode 14 and anode 16, including catalyst 14' and catalyst 16', are positioned adjacent to, and preferably in contact with the separator 12 and can be porous metal layers deposited (e.g., by vapor deposition) onto the separator 12, or can have structures comprising discrete catalytic particles adsorbed onto a porous substrate that is attached to the separator 12. Alternatively, the catalyst particles can be deposited on high surface area powder materials (e.g., graphite or porous carbons or metal-oxide particles) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, the cathode and anode layers 14 and 16 may also include a binder material, such as a polymer, especially one that also acts as an ionic conductor such as anion-conducting ionomers. In some embodiments, the cathode and anode layers 14 and 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

The cathode 14 and anode 16 can be controllably electrically connected by electrical circuit 18 to a controllable electric power system 20, which can include a power source (e.g., DC power rectified from AC power produced by a generator powered by a gas turbine engine used for propulsion or by an auxiliary power unit) and optionally a power sink. In some embodiments, the electric power system 20 can optionally include a connection to an electric power sink (e.g., one or more electricity-consuming systems or components onboard the vehicle) with appropriate switching, power conditioning, or power bus(es) for such on-board electricity-consuming systems or components, for optional operation in an alternative fuel cell mode. Inerting gas systems with electrochemical cells that can alternatively operate to produce nitrogen-enriched air in a fuel-consuming power production (e.g., fuel cell) mode or a power consumption mode (e.g., electrolyzer cell) are disclosed in US patent application publication no. 2017/0331131 A1, the disclosure of which is incorporated herein by reference in its entirety.

With continued reference to FIG. 2, a cathode supply fluid flow path 22 directs gas from a fuel tank ullage space (not shown) into contact with the cathode 14. Oxygen is electrochemically depleted from air along the cathode fluid flow path 23, and is discharged as nitrogen-enriched air (NEA) (i.e., oxygen-depleted air, ODP) to an inerting gas flow path 24 for delivery to an on-board fuel tank (not shown), or to a vehicle fire suppression system associated with an enclosed space (not shown), or controllably to either or both of a vehicle fuel tank or an on-board fire suppression system. An anode fluid flow path 25 is configured to controllably receive an anode supply fluid from an anode supply fluid flow path 22'. The anode fluid flow path 25 can include water if the electrochemical cell is configured for proton transfer across the separator 12 (e.g., a proton exchange membrane (PEM) electrolyte or phosphoric acid electrolyte). If the electrochemical cell is configured for oxygen anion transfer across the separator 12 (e.g., a solid oxide electrolyte), it can optionally be configured to receive air along the anode fluid flow path 25. Although not stoichiometrically required by the electrochemical reactions of the solid oxide electrochemical cell, airflow to the anode during power-consumption mode can have the technical effects of diluting the potentially hazardous pure heated oxygen at the anode, and providing thermal regulation to the cell. If the system is configured for alternative operation in a fuel cell mode, the anode fluid flow path 25 can be configured to controllably also receive fuel (e.g., hydrogen for a proton-transfer cell, hydrogen or hydrocarbon reformate for a solid oxide cell). Anode exhaust 26 can, depending on the type of cell and the anode exhaust content, be exhausted or subjected to further processing. Control of fluid flow along these flow paths can be provided through conduits and valves (not shown), which can be controlled by a controller 36.

In some embodiments, the electrochemical cell 10 can operate utilizing the transfer of protons across the separator 12. Exemplary materials from which the electrochemical proton transfer electrolytes can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the separator 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid fuel cells.

During operation of a proton transfer electrochemical cell in the electrolyzer mode, water at the anode undergoes an electrolysis reaction according to the formula $$H_2O \rightarrow \tfrac{1}{2}O_2 + 2H^+ + 2e^- \qquad (1)$$

The electrons produced by this reaction are drawn from electrical circuit 18 powered by electric power source 20 connecting the positively charged anode 16 with the cathode 14. The hydrogen ions (i.e., protons) produced by this reaction migrate across the separator 12, where they react at the cathode 14 with oxygen in the cathode flow path 23 to produce water according to the formula $$\tfrac{1}{2}O_2 + 2H^+ + 2e^- \rightarrow H_2O \qquad (2)$$

Removal of oxygen from cathode flow path 23 produces nitrogen-enriched air exiting the region of the cathode 14. The oxygen evolved at the anode 16 by the reaction of formula (1) is discharged as oxygen or an oxygen-enriched air stream as anode exhaust 26.

During operation of a proton transfer electrochemical cell in a fuel cell mode, fuel (e.g., hydrogen) at the anode undergoes an electrochemical oxidation according to the formula $$H_2 \rightarrow 2H^+ + 2e^- \qquad (3)$$

The electrons produced by this reaction flow through electrical circuit 18 to provide electric power to an electric power sink (not shown). The hydrogen ions (i.e., protons) produced by this reaction migrate across the separator 12, where they react at the cathode 14 with oxygen in the cathode flow path 23 to produce water according to the formula (2).

$$\tfrac{1}{2}O_2 + 2H^+ + 2e^- \rightarrow H_2O \qquad (2)$$

Removal of oxygen from cathode flow path 23 produces nitrogen-enriched air exiting the region of the cathode 14.

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice moisture will be removed by NEA 24 (either entrained or evaporated into the nitrogen-enriched air) as it exits from the region of cathode 14. Accordingly, in some exemplary embodiments, water is circulated past the anode 16 along an anode fluid flow path (and optionally also past the cathode 14). Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16 (not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

In some embodiments, the electrochemical cell 10 can operate utilizing the transfer of oxygen anions across the separator 12. Exemplary materials from which the electrochemical oxygen anion-transporting electrolytes can be fabricated include solid oxides such as yttria-stabilized zirconia and/or ceria doped with rare earth metals. These types of materials are well known and have been used in solid oxide fuel cells (SOFC).

During operation of an oxygen anion transfer electrochemical cell in a power consuming (e.g., electrolyzer) mode, oxygen at the cathode undergoes an electrochemical reduction reaction according to the formula $$\frac{1}{2}O_2 + 2e^- \rightarrow O^= \qquad (4)$$

The electrons consumed by this reaction are drawn from electrical circuit 18 powered by electric power source 20 connecting the positively charged anode 16 with the cathode 14. The oxygen anions produced by this reaction migrate across the separator 12, where they undergo an electrochemical oxidation reaction at the anode 14 according to the formula $$O^= \rightarrow \frac{1}{2}O_2 + 2e^- \qquad (5)$$

Removal of oxygen from cathode flow path 24 produces nitrogen-enriched air exiting the region of the cathode 14. The oxygen produced at the anode 16 by the reaction of formula (5) is discharged as oxygen or an oxygen-enriched air stream as anode exhaust 26.

During operation of an oxygen ion transfer electrochemical cell in a fuel cell mode, oxygen at the cathode undergoes an electrochemical reduction reaction according to the formula $$\frac{1}{2}O_2 + 2e \rightarrow O^= \qquad (4)$$

The electrons consumed by this reaction are drawn from electrons liberated at the anode, which flow through electrical circuit 18 to provide electric power to electric power sink (not shown). The oxygen anions produced by this reaction migrate across the separator 12, where they react with fuel such as hydrogen at the anode according to the formula $$H_2 + O^= \rightarrow H_2O + 2e^- \qquad (6)$$

Carbon monoxide (e.g., contained in fuel reformate) can also serve as fuel in solid oxide electrochemical cells. In this case, the oxygen anions produced at the cathode according to formula (4) migrate across the separator 12 where they react with carbon monoxide at the anode according to the formula $$CO + O^= \rightarrow CO_2 + 2e^- \qquad (7)$$

Removal of oxygen from cathode flow path 24 produces nitrogen-enriched air exiting the region of the cathode 14. The steam and carbon dioxide produced at the anode 16 by the reactions of formulas (6) and (7) respectively is discharged along with unreacted fuel as anode exhaust 26. The unreacted fuel that exits anode 16 via anode exhaust flow path 26 can be recycled to fuel flow path 32 using an ejector or blower (not shown). It can also be fed to a fuel processing unit wherein the steam and carbon dioxide contribute to reforming.

In some embodiments, a controller 36 can be in operative communication with the electrochemical cell, the membrane gas separator, and any associated valves, pumps, compressors, conduits, or other fluid flow components, and with switches, inverters, regulators, sensors, and other electrical system components, and any other system components to selectively operate the inerting gas system. These control connections can be through wired electrical signal connections (not shown) or through wireless connections. In some embodiments, the controller 36 can be configured to operate the system according to specified parameters, as discussed in greater detail further below.

Figure 3:
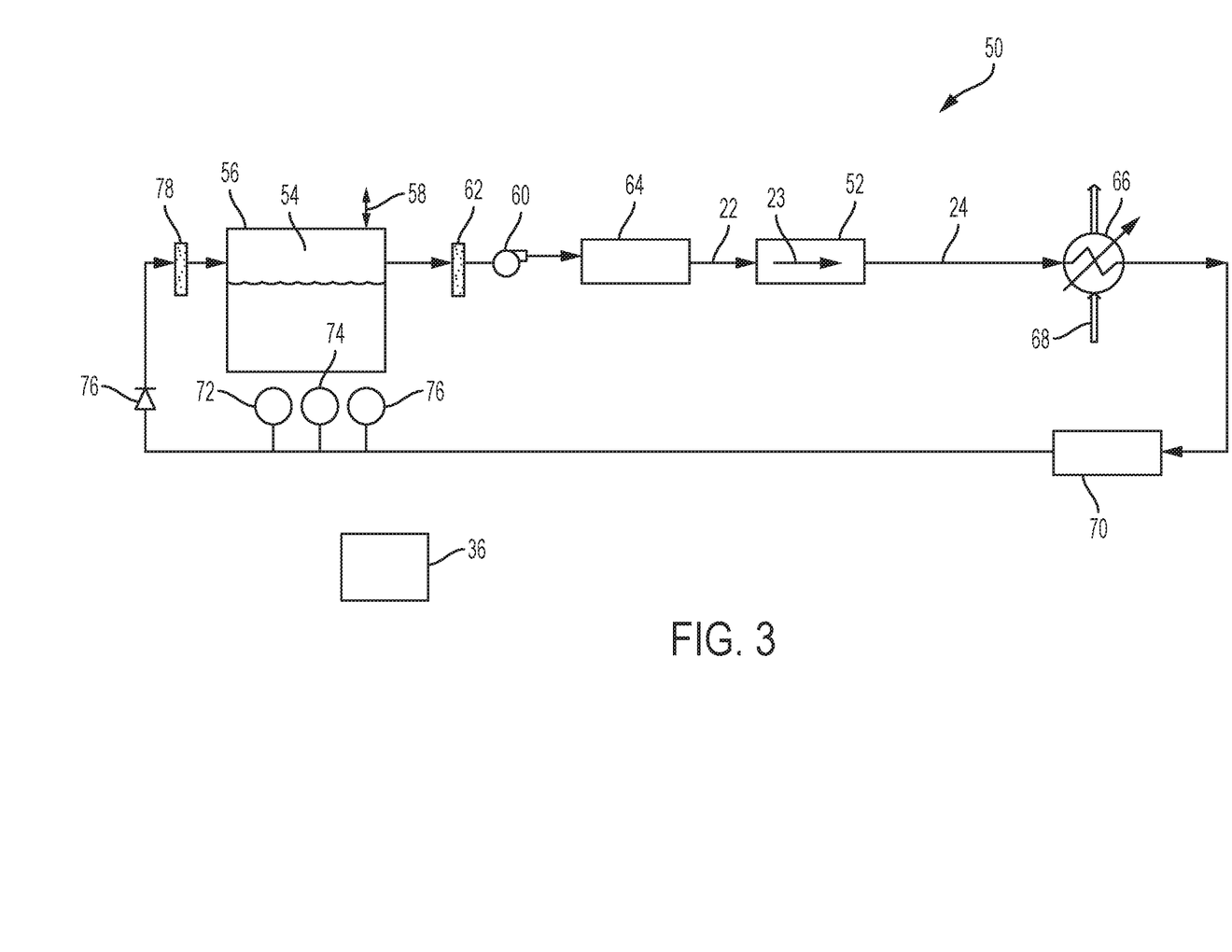
FIG. 3 is a schematic illustration of an example embodiment of an electrochemical inerting system.

Turning now to FIG. 3, there is shown an inerting system 50 with an electrochemical cell stack 52 that receives a cathode supply feed 22 from a protected space 54 such as an aircraft fuel tank ullage space, a cargo hold, or an equipment bay, and is electrically connected to a power source or sink (not shown). For illustration purposes, the protected space 54 is shown as an ullage space in a fuel tank 56 with vent 58, but the protected space could also be a cargo hold or an equipment bay. Gas from the protected space 54 is directed by a fan or blower 60 through an optional flame arrestor 62 and optional gas treatment module 64 to an internal cathode inlet header (not shown) to cathode fluid flow paths 23 along the cathodes in the cell stack. For ease of illustration, anode fluid flow through an anode header of the stack 64 is not shown in FIGS. 3-4, but can be as according to FIG. 2 and the description thereof with connection to process materials and equipment accordingly as described (e.g., fuel or water feed connections to an anode side of a PEM electrochemical cell for operation in fuel cell or electrolyzer mode, respectively). Various types of gas treatment modules can be utilized, either integrated into a single module or as separate modules disposed in series or parallel along the cathode supply fluid flow path 22. In some embodiments, the gas treatment module can be configured to remove fuel vapor from the cathode supply gas, or to remove one or more fuel contaminants from the cathode supply gas, or to remove other contaminants such as smoke such as from a fire in a cargo hold if the protected space includes a cargo hold, or any combination of the above from the cathode supply gas. Examples of gas treatments include membrane separators (e.g., a reverse selective membrane with a membrane that has greater solubility with fuel vapor than air) with an optional sweep gas on the side of the membrane opposite the cathode supply fluid flow path, adsorbents (e.g., activated carbon adsorbent as a fuel vapor trap), or a combustor such as a catalytic oxidation reactor or other combustion reactor. Examples of gas treatments that can remove contaminants include any of the above-mentioned gas treatments for removal of fuel vapor (e.g., adsorbents or catalysts for removal or deactivation of fuel contaminants such as sulfur-containing compounds that could poison catalysts in the electrochemical cell, as well as other treatments such as filters or activated carbon adsorbers.

With continued reference to FIG. 3, oxygen-depleted air is discharged from the cathode side of the electrochemical cells in the electrochemical cell stack 52 along the inerting gas flow path 24 toward the protected space(s) 54. In some embodiments, a water removal module comprising one or more water removal stations can be disposed between the electrochemical cell stack 52 and the protected space(s) 54. Examples of water removal modules include heat exchanger condensers (i.e., a heat exchanger in which removal of heat condenses water vapor to liquid water, which is separated from the gas stream), membrane separators, desiccants. In some embodiments or operating conditions (e.g., on-ground operation), the heat exchanger condenser 66 may not remove all of the desired amount of water to be removed, so supplemental drying can optionally be provided. As shown in FIG. 3, a heat exchanger condenser 66 cooled by ram air 68 removes water from the inerting gas, and an additional dryer 70 such as a membrane separator or desiccant removes residual water not removed by the heat exchanger condenser 66. Sensors such as humidity sensor 72, temperature sensor 74, or oxygen sensor 76 can monitor the quality of the inerting gas, and used to control when and under what parameters the system should be operated. Additional optional features, such as check valve 76 and flame arrestor 78, can help promote safe and efficient flow of inerting gas to the protected space(s) 54.

Figure 4:
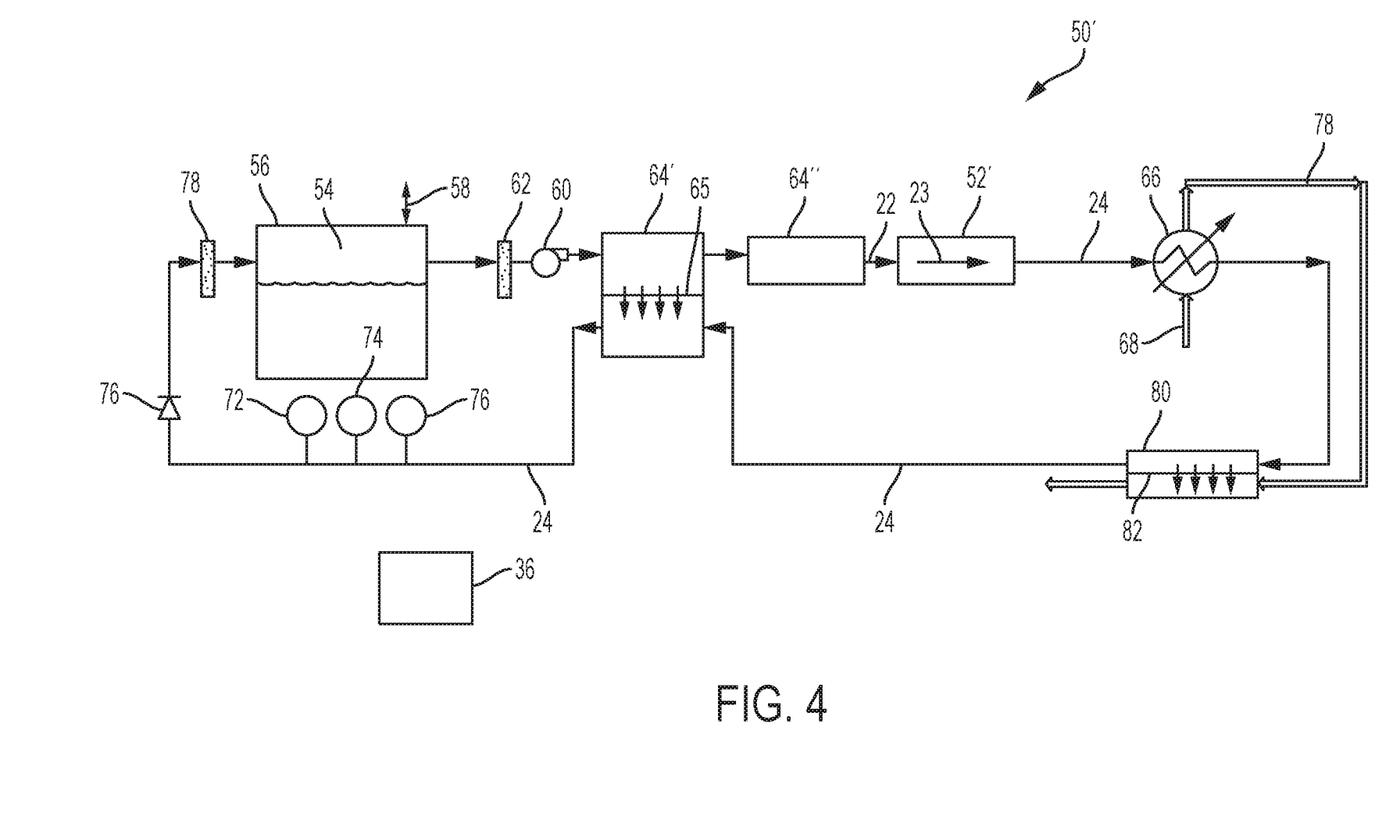
FIG. 4 is a schematic illustration of an example embodiment of an PEM electrochemical cell inerting system.

Turning to FIG. 4, an example embodiment of an inerting system 50' with a PEM electrochemical cell 52' is shown. This figure is otherwise the same as FIG. 3 except as described below. As shown in FIG. 4, a reverse selective membrane gas treatment module 64' and a filter 64" on the cathode supply fluid flow path includes a membrane 65 in which fuel vapor has a greater solubility than air (oxygen and nitrogen molecules). Membrane separators and their use are described in greater detail in US patent application Publication no. 2017/0368496 A1, the disclosure of which is incorporated herein by reference in its entirety. The inerting gas flow path 24 is routed along the opposite side of the membrane 65 from the cathode supply path. The preferential selectivity of the membrane 65 for the fuel vapor promotes transfer of fuel vapor molecules across the membrane 65 to the inerting gas flow path 24 acting as a sweep gas.

A water removal module in the form of a membrane separator 80 is disposed on the inerting gas flow path. As shown in FIG. 4, the membrane separator 80 includes a membrane 82 in which water has a greater solubility than air (oxygen and nitrogen molecules) or fuel vapor. Used ram air discharge 78 from the heat exchanger condenser 66 is routed along the opposite side of the membrane from the inerting gas flow path. The preferential selectivity of the membrane 82 for water promotes transfer of water molecules across the membrane 82 to the ram air discharge 78 acting as a sweep gas. The membrane 82, in different modes of operation, selectively transports water vapor. Various materials and configurations can be utilized for the gas separation membrane. Gas separation membranes can rely on one or more physical phenomena for selectivity in transportation of gases across the membrane. In some embodiments, a selective membrane can rely on size-selective pathways through the membrane that selectively allows transport of smaller molecules over larger molecules. Examples of such membranes include membranes that selectively allow faster transport of smaller water molecules compared to larger nitrogen, oxygen, or fuel molecules. Such membranes typically rely on molecule size-selective tortuous paths through a non-porous polymer matrix in the form of a thin film deposited onto a microporous layer. In addition to molecular size, the condensability of a molecule is another parameter that can be used in membrane-based gas separations: the more condensable molecule is selectively permeated over the less condensable molecule(s) due to its higher solubility in the polymer matrix, which in turn leads to a larger driving force for permeation. Since water molecules are both much smaller and more condensable than oxygen and nitrogen, the selective permeation of water can be accomplished with essentially any polymer-based membrane. Examples of selective materials for water include polyimides known for use in dehydration applications or 2,2-bistrifluoromethyl-4,5-difluoro-1,3-dioxole/tetrafluoroethylene, silicone rubbers (polydimethyl siloxane, polyoctylmethyl siloxane), polysulfones, polyethers (e.g., a copolymer of poly(ethylene oxide) (PEO) and poly(butylene therephthalate) (PBT), polycarbonates, poly(4-methyl-2-pentyne), poly-trimethylsilyl-propyne (PTMSP), etc. The gas selective membrane can include any of the above materials, alone or in combination with each other or other selective materials. Combinations of different materials can be integrated into a single membrane structure (e.g., in layers, or zones in the x-y plane of a membrane structure), or can be disposed in series or in parallel as separate membrane structures or modules. However, while any of the aforementioned polymers can selectively permeate water vapor over oxygen and nitrogen, maximizing the membrane's selectivity towards water will minimize the loss of feed air through the membrane during operation when vacuum is the driving force; hence, proper identification of a membrane layer is an important consideration in the case of the membrane dryer connected to a vacuum pump. Additional examples of polymer membranes include polyimides, polycarbonates and polysulfones.

Figure 5:
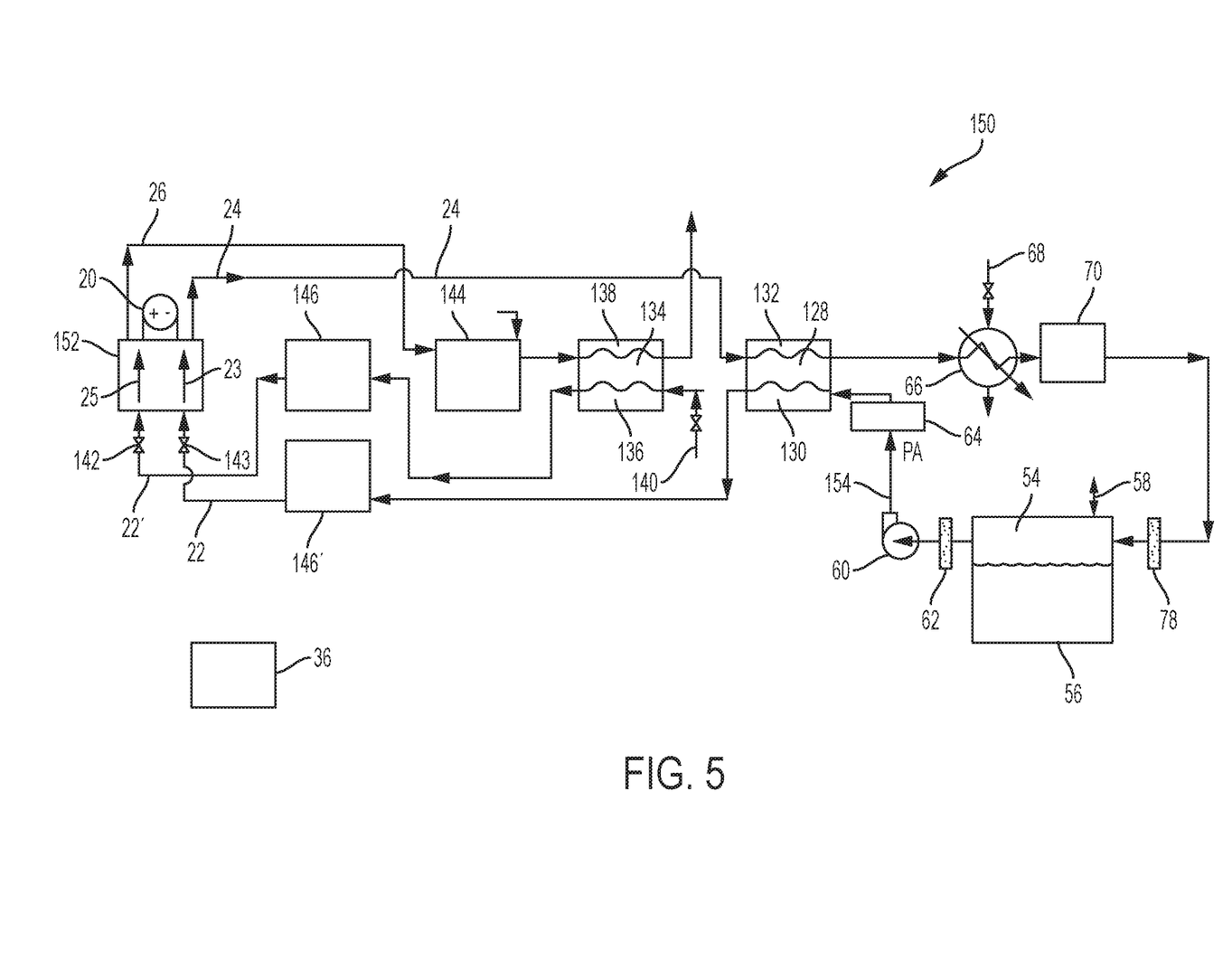
FIG. 5 is a is a schematic illustration of an example embodiment of a solid oxide electrochemical cell inerting system

Turning to FIG. 5 (which uses some same numbering from FIG. 3 to identify like items in FIG. 5), an example embodiment of an inerting system 150 with a solid oxide electrochemical cell stack 152 is shown. The system 150 includes a cathode heat recovery heat exchanger 128 with sides 130 and 132, anode heat recovery heat exchanger 134 with sides 136 and 138, flow control valves 142 and 143, solid oxide electrochemical cell stack 152, burner 144, and inlet 154. The system 150 is arranged so cathode supply feed 22 from the protected space 54 flows into inlet 154 from blower 60, through filter 64, through cathode heat recovery heat exchanger 128, to solid electrochemical stack 152, along the cathode fluid flow path 23 where oxygen is removed, and then oxygen-depleted air is routed through the hot side 132 of the cathode heat recovery heat exchanger 128 and to condenser 66 before being sent back to the protected space(s) or other fire suppression location. Anode feed air can be used for temperature control, and is directed from an outside air source (not shown) connected to inlet 140, through anode heat recovery heat exchanger 134, through heater 146 to the electrochemical cell stack 152 where it is delivered to the anode side fluid flow path 25. Anode exhaust stream 26 is directed to optional burner 144 and then to the hot side of heat exchanger 134 before being sent elsewhere.

The heat exchangers 128, 134, the flow control valve 142, heaters 146, 146', and burner 144 can control incoming process gas to a range of 500-1000° C., or a range of 650-850° C. Cathode supply feed from the inlet 154 first enters cathode heat recovery heat exchanger 128. Cathode heat recovery heat exchanger 128 has two sides: cold side 130 and hot side 132. The cathode supply feed enters cathode heat recovery heat exchanger 128 in cold side 130, where process air is heated from the hot inert product gas. Heated cathode supply feed is then routed to electrochemical stack 152. Anode feed air can be used for simultaneous stack cooling and dilution of oxygen on the anode side of electrochemical stack 152. Anode air enters inlet 140 and is directed to anode heat recovery heat exchanger 134 which has two sides: cold side 136 and hot side 138. As shown in FIG. 5, the anode feed air is heated in the anode heat recovery heat exchanger 134 cold side 136, and is optionally further temperature-conditioned in heater 146' before flowing to solid oxide electrochemical stack 152. Burner 144 is optional, and can be used for oxygen-enriched combustion to generate heat (for example during start-up). The combustion process of a burner, if used depletes the gas stream of oxygen, and with proper control of stoichiometry can generate additional inert gas.

The flow of heated process air into the stack 152 can be regulated by flow control valves 142, 143, allowing for both temperature and safety control of the stack 152. Flow control valve 143 controls flow of process air into the cathode side of the stack 152. Flow control valve 142 can optionally regulate and shut off flow of heated gas to the anode side of the stack 152. For example, if flow control valve 142 is open and heated process gas is flowed into the anode side of the stack 152, the heated air can warm up the stack and allow quicker startup by promoting the kinetics of those reactions. Less activation energy is required for the reactions when the stack is at higher temperatures. At low oxygen removal rates, additional heated air may be required to maintain a desirable operating temperature.

When the solid oxide stack 152 is operating, cooling of anode process air may be necessary to remove heat from internal resistance losses resulting from irreversible processes. Optionally, the system 150 can include a temperature sensor proximate to the stack 152 in communication with the controller so that the flow of cooling air or heated air through the stack 152 can be controlled based on current temperatures. Additionally, when the solid oxide electrochemical stack 152 is running, the anode evolves oxygen as described above in reference to FIG. 2. Flowing dilution air into the anode side of the stack through valve 142 can dilute oxygen exiting the anode, tailoring the concentration of oxygen in OEA and preventing highly concentrated oxygen from flowing through the aircraft, as hot oxygen is reactive and potentially dangerous. Adjusting dilution air running into the anode allows for specific gas composition (and oxygen concentration) exiting the anode. Similarly, if a high concentration exiting the anode side of stack 152 is desired for further use as an oxidant for combustion, then less dilution air can be used as long sufficient anode feed air flows to cool electrochemical stack 152.

In addition to supplying ODA to the ullage of the fuel tank(s) onboard the aircraft, the ODA may be also be used for other functions, such as serving as a fire-suppression agent. For example, cargo compartments onboard aircraft typically have fire-suppression systems that include a dedicated gas-distribution system comprising tubes routed to nozzles in the cargo bay to deploy fire-suppression agents in the event of a fire. A variety of fire-suppression agents may be deployed depending on the type and extent of the fire. In the case of a fire, all or some of the ODA could be routed to one or more of these fire-suppression distribution systems. This may be especially beneficial during the aircraft descent during a hull breach when the cargo bay is becoming re-pressurized to reduce the ingress of oxygen that can feed the fire. In this case, the system may be operated to produce ODA at the maximum flow rate. The ODA could also be used to enable inerting coverage over extended periods, which may be in addition to, or in lieu of, dedicated low-rate discharge inerting systems in the cargo bay(s).

During operation, the system can be controlled by controller 36 to set fluid flow rates (e.g. feed rates of air to the cathode 14 or to the anode 16, or of water or water vapor in the air feed to the cathode 14 or $CO_2$ in the air feed to cathode 14 or anode 16, and the current or voltage levels produced by electric power source 20 to produce varying amounts of ODA in response to system parameters. Such system parameters can include, but are not limited to mission phase, temperature of the fuel in protected space(s) 56, oxygen content of the fuel in the case of a fuel tank protected space, oxygen content of gas in the protected space(s) 56, and temperature and/or pressure of vapor in the ullage of any fuel tank protected space(s), temperature and pressures in the electrochemical cell stack 52/152, and temperature, oxygen content, and/or humidity level of the inert gas. Accordingly, in some embodiments, the fuel tank ullage gas management system such as shown in FIGS. 3-5 can include sensors for measuring any of the above-mentioned fluid flow rates, temperatures, oxygen levels, humidity levels, or current or voltage levels, as well as controllable output fans or blowers, or controllable fluid flow control valves or gates. These sensors and controllable devices can be operatively connected to a system controller. In some embodiments, the system controller can be dedicated to controlling the fuel tank ullage gas management system, such that it interacts with other onboard system controllers or with a master controller. In some embodiments, data provided by and control of the fuel tank ullage gas management system can come directly from a master controller.

In some embodiments, the inerting system can be operated continuously to produce a gas in a fuel tank protected space that is highly oxygen-depleted, which can promote a reduced load on the system during descent when outside oxygen-containing air enters the fuel tank. In some embodiments, the system can be turned off or maintained in a stand-by mode during periods of low fire risk as disclosed by U.S. patent application Ser. No. 15/378,687 filed Dec. 14, 2016, the disclosure of which is incorporated herein by reference in its entirety.

As mentioned above, in some embodiments, the system can be operated in an alternate mode as a fuel cell in which fuel (e.g., hydrogen) is delivered to the anode and air is delivered to the cathode. Depending on the fuel cell type, the fuel may be hydrogen, carbon monoxide, natural gas (primarily methane), or any other suitable reductant. At the anode, the fuel undergoes oxidation in which electrons are liberated whereas at the cathode, the reduction of oxygen ensues. Electricity produced by the electrochemical cell in a power production mode is delivered to a power sink such a power-consuming component or an electrical bus connected to one or more power-consuming components. In some embodiments, the system can be operated in a mode selected from a plurality of modes that include at least the above-described power-consuming mode and power-producing (fuel cell) mode (both of which produce ODA at the cathode), and can also optionally include other modes such as a start-up mode. In such embodiments, the electrical connection 18 (FIG. 2) would provide controllable connection to either a power source or a power sink.

In some embodiments, various technical effects can be provided, including but not limited to low oxygen concentrations in fuel tank ullage spaces, reduced power consumption compared to electrochemical cell-based inerting systems that use fresh air for the cathode supply feed, capability to operate when fuel tanks are low on fuel vapor such as at cruise conditions (compared to a catalytic combustion reactor that requires fuel vapor to produce ODA), and no generation of $CO_2$ or water (compared to catalytic combustion reactors that produce $CO_2$ and water, which can require additional handling measures).

The term "about", if used, is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing inerting gas to a protected space, comprising
an electrochemical cell comprising a cathode and an anode separated by a separator comprising an ion transfer medium;
a cathode fluid flow path in operative fluid communication with a catalyst at the cathode between a cathode fluid flow path inlet and a cathode fluid flow path outlet;
a cathode supply fluid flow path between the protected space and the cathode fluid flow path inlet;
an anode fluid flow path in operative fluid communication with a catalyst at the anode, including an anode fluid flow path outlet;
an electrical connection to a power source or power sink;
an inerting gas flow path in operative fluid communication with the cathode flow path outlet and the protected space;
a gas treatment module configured to remove fuel vapor, smoke, or a contaminant from the cathode supply flow path, wherein the gas treatment module includes a membrane separator comprising the cathode supply fluid flow path on a first side of a membrane, and the inerting gas flow path as a sweep gas on a second side of the membrane.

2. The system of claim 1, further comprising a water removal module on the cathode supply fluid flow path, or the cathode fluid flow path, or the inerting gas flow path.

3. The system of claim 2, wherein the water removal module is on the inerting gas flow path.

4. The system of claim 2, wherein the water removal module includes any one or combination of: a heat exchanger condenser, a gas-liquid separator, a membrane dryer, a desiccant.

5. The system of claim 4, wherein the water removal module comprises a heat exchanger condenser and a membrane dryer.

6. The system of claim 5, wherein the membrane dryer includes the inerting gas flow path on a first side of a membrane, and a sweep gas flow path comprising ram air exhaust from a heat absorption side of the heat exchanger condenser.

7. The system of claim 1, wherein the ion transfer medium comprises a proton exchange membrane, and the electrochemical cell is configured to produce protons at the anode and transfer the protons across the proton exchange membrane to the cathode.

8. The system of claim 1, wherein the ion transfer medium comprises a solid oxide, and the electrochemical cell is configured to produce oxygen anions at the cathode and transfer the oxygen anions across the solid oxide ion transfer medium to the anode.

9. The system of claim 1, wherein the inerting gas flow path is further in operative communication with a fire suppression system.

10. The system of claim 1, wherein the protected space comprises a fuel tank ullage space.

11. An aircraft comprising:
an aircraft body and an engine;
an electrochemical cell comprising a cathode and an anode separated by a separator comprising an ion transfer medium;
a cathode fluid flow path in operative fluid communication with a catalyst at the cathode between a cathode fluid flow path inlet and a cathode fluid flow path outlet;
a cathode supply fluid flow path between the protected space and the cathode fluid flow path inlet;
an anode fluid flow path in operative fluid communication with a catalyst at the anode, including an anode fluid flow path outlet;
an electrical connection to a power source or power sink;
an inerting gas flow path in operative fluid communication with the cathode flow path outlet and the protected space;
a gas treatment module configured to remove fuel vapor, smoke, or a contaminant from the cathode supply flow path, wherein the gas treatment module includes a membrane
separator comprising the cathode supply fluid flow path on a first side of a membrane, and the inerting gas flow path as a sweep gas on a second side of the membrane.

12. The aircraft of claim 11, wherein the protected space is selected from a fuel tank ullage space, a cargo hold, or an equipment bay.

13. The aircraft of claim 12, wherein the cathode supply fluid flow path receives fluid flow from any one or more of the fuel tank ullage space, cargo hold, or equipment bay, and the inerting gas flow path delivers inerting gas to any one or more of the fuel tank ullage space, cargo hold, or equipment bay.

14. The aircraft of claim 11, wherein the protected space comprises a fuel tank ullage space.

15. A method of inerting a protected space, comprising
delivering gas from the protected space to a cathode of an electrochemical cell;
reducing oxygen at the cathode to generate oxygen-depleted air at the cathode of the electrochemical cell;
directing the oxygen-depleted air from the cathode of the electrochemical cell along an inerting gas flow path to the protected space;
directing gas from a cathode supply flow path to a gas treatment module configured to remove fuel vapor, smoke, or a contaminant from the cathode supply flow path, wherein the gas treatment module includes a membrane separator comprising the cathode supply fluid flow path on a first side of a membrane, and the inerting gas flow path as a sweep gas on a second side of the membrane.

* * * * *